United States Patent [19]

Hershey et al.

[11] Patent Number: 5,867,489
[45] Date of Patent: Feb. 2, 1999

[54] METHOD AND APPARATUS FOR TDMA SLOT SYNCHRONIZATION WITH PRECISION RANGING

[75] Inventors: John Erik Hershey, Ballston Lake; Gary Jude Saulnier, Rexford; Stephen Michael Hladik, Albany; Richard Charles Gaus, Jr., Burnt Hills; Wayne Curtis Taft, Scotia; Richard August Korkosz, Rotterdam Junction; Glen William Brooksby, Glenville, all of N.Y.

[73] Assignee: Lockheed Martin Corp., King of Prussia, Pa.

[21] Appl. No.: 691,964

[22] Filed: Aug. 5, 1996

Related U.S. Application Data

[60] Provisional application No. 60/015,855 May 29, 1996.
[51] Int. Cl.$^6$ .................................................. H04J 3/16
[52] U.S. Cl. ............................................ 370/324; 370/442
[58] Field of Search ................................. 370/324, 310, 370/319, 320, 321, 329, 335, 337, 347, 342, 315, 216, 274, 316, 330, 343, 344, 345, 350, 442, 441, 515, 519, 503, 501, 492; 375/200, 205, 207, 359, 358, 356, 355; 379/221; 455/5.1, 32, 427; 340/825.01, 827; 395/181

[56] References Cited

U.S. PATENT DOCUMENTS

| | | | |
|---|---|---|---|
| 4,745,599 | 5/1988 | Raychaudhuri | 370/93 |
| 5,440,562 | 8/1995 | Cutler | 370/324 |
| 5,659,545 | 8/1997 | Sowles et al. | 370/324 |

*Primary Examiner*—Dang Ton
*Attorney, Agent, or Firm*—W. H. Meise; G. H. Krauss; S. A. Young

[57] ABSTRACT

In a time division multiple access spacecraft communication system, each ground station determines when to send its information packets to arrive at the spacecraft at the beginning of a time slot. The calculation is based upon knowledge of the location of the spacecraft. A master ground station determines the location of the spacecraft by the use of the propagation delays between the various ground stations (including itself) and the spacecraft, together with knowledge of the locations of the ground stations. The spacecraft location is then transmitted back to the various ground stations. The determination of propagation delay by each ground station is performed in two major steps. The first step determines coarse time delay to within one bit interval by repeatedly transmitting a multibit unique word to the spacecraft, and counting bits until the next unique word is received from the spacecraft. To determine fine propagation delay, a high-frequency clock signal is counted from the time of transmission of each bit edge until the reception of the next bit edge. The sum of the coarse and fine delays, together with a plurality of frame intervals, establishes the range to the spacecraft.

7 Claims, 10 Drawing Sheets

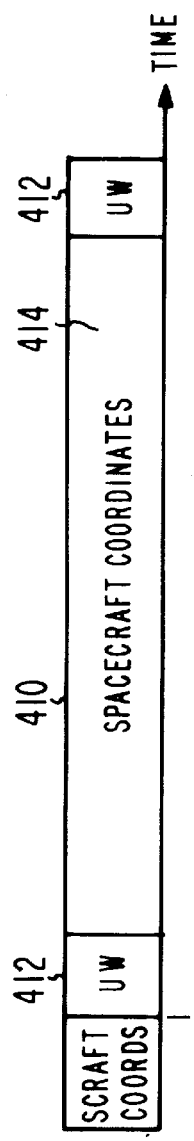
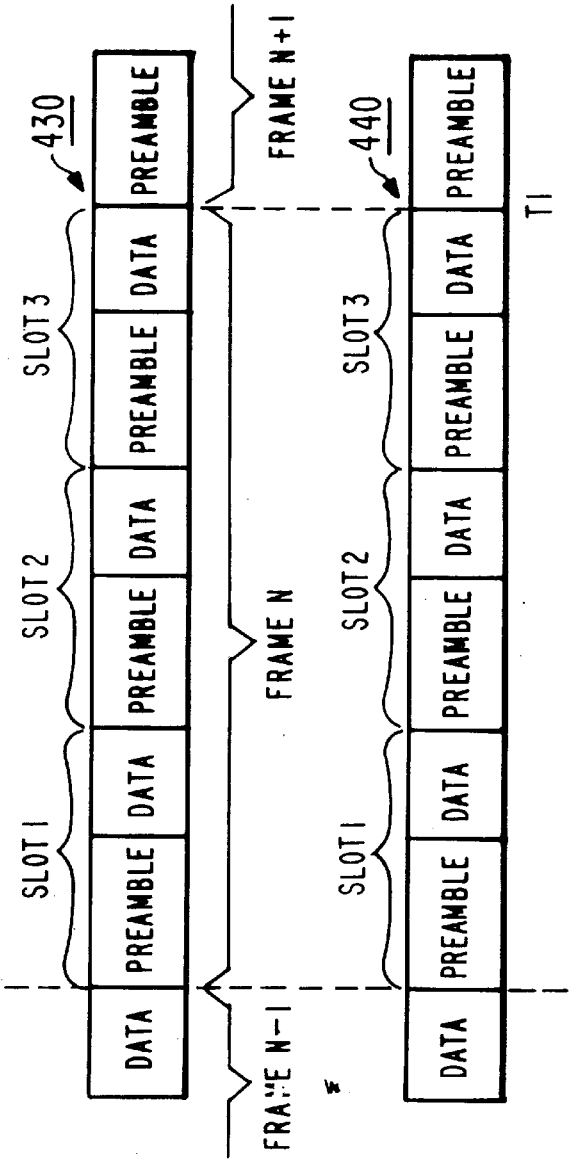
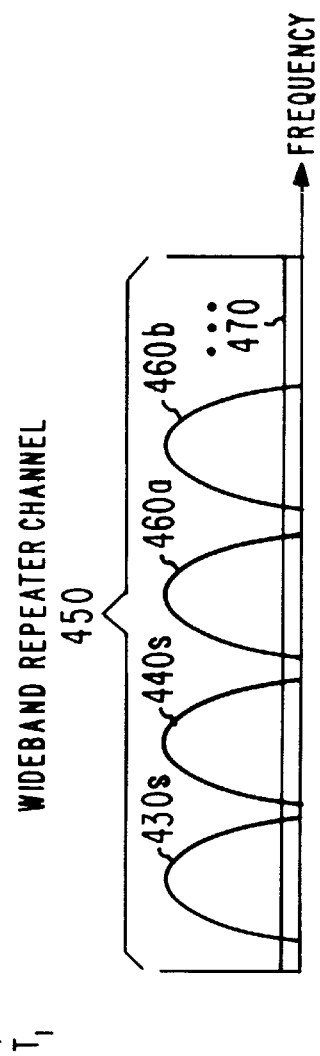
Fig. 4a
Fig. 4b
Fig. 4c
Fig. 4d

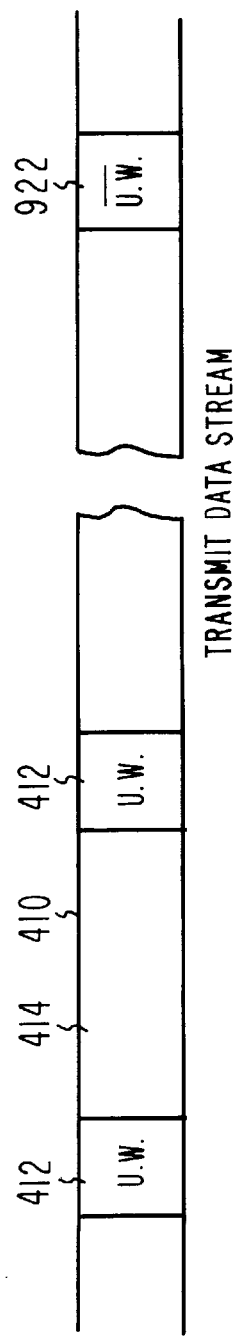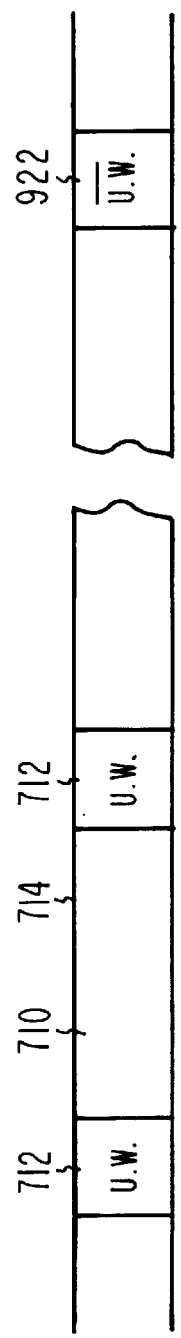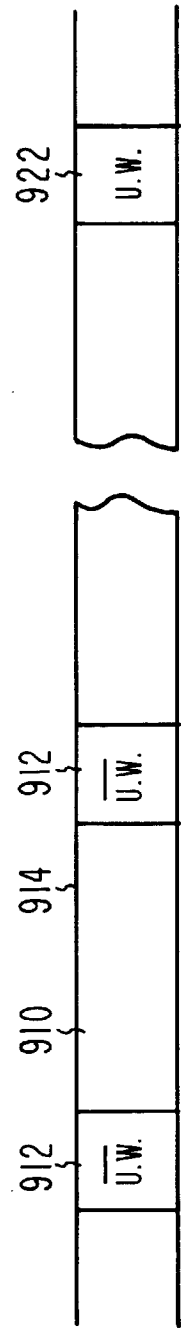

METHOD AND APPARATUS FOR TDMA SLOT SYNCHRONIZATION WITH PRECISION RANGING

This is a continuation or provisional application Ser. No. 60/015,855, filed May 29, 1996.

FIELD OF THE INVENTION

This invention relates to time division multiple access communications systems in which the communications channel includes a loop-back through a spacecraft, and more particularly to such systems in which a spread-spectrum overlay channel is superposed on the data channels for aiding in establishing network time synchronization based upon spacecraft location relative to the earth stations, and for communicating the location information among the earth Stations, and most particularly to such a system in which the range from each ground station to the spacecraft is determined with fine resolution.

BACKGROUND OF THE INVENTION

Communication channels on spacecraft or satellites may be dedicated for use between particular ground stations, in which case transmissions may take place continuously from one of the stations to the other. Bidirectional transmissions may take place if some means is provided for separating the signals, such as frequency-division multiple access. When multiple ground stations use the same spacecraft channel for communications among themselves, some arrangement must be provided for preventing simultaneous transmission of two or more signals through the same spacecraft channel, because such signals may interact or interfere in the channel, so that information is lost. In one prior-art approach, each transmission must be terminated before the next one is transmitted through the channel. This mode of use is known as time-division multiple access, or TDMA. In contrast, a random access scheme known as "ALOHA" allows each ground station to transmit packets at random times in a mode which probablistically may be in contention with other stations, with the result that, when there are many users of the channel, many of the transmitted packets interfere. Aloha provides a rescheduling protocol which enhances the likelihood that later transmissions will traverse the channel without interference. One such Aloha system is described in U.S. Pat. No. 4,745,599, issued May 17, 1988 in the name of Raychaudhuri. The Aloha type systems suffer from the disadvantage that utilization of the spacecraft channel is essentially wasted during the time in which it processes signals which interfere. It should be noted that a spacecraft channel may partially overlap the frequency or frequencies of adjacent channels in "frequency re-use" operation.

The utilization time of a spacecraft channel may be improved by synchronizing the transmissions from the various ground stations in such a manner that each packet arrives at the spacecraft at the beginning of one of a plurality of sequential "slot" intervals. Each slot interval is equal in time duration to the packet interval, so that a stream of packets arriving at the spacecraft from different ground stations, with each packet arriving at the time of the beginning of a different slot interval, will traverse the spacecraft channel in a continuous sequence, without times in which the spacecraft channel is unutilized, and without interference by one packet with the signal of two adjacent time-sequential packets. This improves the utilization of the channel, but is difficult to implement because each ground station is at a different distance from the spacecraft, and therefore signals from each ground station have different propagation times to the spacecraft. In addition, because the spacecraft moves relative to the ground stations, the propagation delays change with time. Some TDMA schemes provide a slot which is longer than the duration of a data packet, so that slight timing errors do not cause a mistimed data packet to interfere with the communication in an adjacent time slot. Such "guard times," however, reduce the throughput of the channel in proportion to their length, and it is therefore desirable to minimize the guard time. Known methods for reducing required guard time intervals generally consume spacecraft power and bandwidth in proportion to the number of active ground stations in a network so that cost in terms of data-carrying capacity becomes significant in large networks. An improved method for synchronization control of a communications spacecraft channel is desired.

SUMMARY OF THE INVENTION

Generally speaking, in a time division multiple access spacecraft communication system, each ground station determines when to send its information packets so as to arrive at the spacecraft at the beginning of an assigned time slot. In the invention, the calculation is based upon knowledge of the location of the spacecraft. A master ground station determines the location of the spacecraft by the use of the propagation delays between three or more ground stations (possibly including itself) and the spacecraft, together with knowledge of the locations of these ground stations. The spacecraft location is then transmitted back to all the ground stations in the network, including those which do not perform ranging, if any. The determination of propagation delay is performed at each of three or more ground stations by recurrently or repeatedly transmitting a broadband ranging signal to the spacecraft, receiving the repeated signal, and measuring the round-trip delay. In one embodiment of the invention, the broadband signal contains a multiple-bit or multibit unique word and possibly other information related to satellite position, and the measurement of delay is performed by counting bit intervals and fractions of a bit interval between transmission to the satellite of the unique word, and its reception from the spacecraft. The delay establishes the range to the spacecraft. In a preferred embodiment of the invention, the range is determined by a broadband ranging signal in effect "overlaid" on a plurality of relatively narrowband TDMA traffic channels.

More particularly, a method for synchronization of TDMA transmissions from ground stations to a spacecraft, for maximizing the utilization of the spacecraft channel, includes various processing steps at each of the three or more ground stations which perform the ranging. In a preferred embodiment, a unique word, and possibly other data relevant to satellite position, is/are modulated by a pseudorandom spreading sequence, and the resulting modulated signals are transmitted from the ground station toward the spacecraft at a transmission time. The unique word is a plurality of sequential bits modulated by the spreading sequence. The spacecraft retransmits this ranging signal, and the ranging signal returns to the ground station. The ground station responds to the first one of the unique words received after the step of transmitting a unique word, by noting the reception time of the unique word. This process of receiving the unique word requires de-spreading the received signal using a replica or copy of the pseudorandom spreading sequence. The difference is taken between the transmission and reception times of the unique word, to form a coarse estimate of the round-trip propagation delay between the ground station and the spacecraft.

A fine propagation delay is determined according to a method for operating a TDMA communication system. The method includes the step, at a first ground station, of transmitting data bursts, intended to be received at a second ground station, toward a transponder station within a frequency channel. The data transmitted by the first ground station is received at the transponder station, together with any other signals arriving within the frequency channel. The transponder station retransmits the same data, and any associated signals, toward the first and second ground stations. At the second ground station, the data retransmitted by the transponder station is received, and at least some of the data is routed to a utilization apparatus. An identifiable digital word, which includes a plurality of bits synchronized with a transmit clock, is generated at the first ground station. The identifiable digital word is modulated at the first ground station by a pseudorandom code which includes a plurality of chips, to thereby form a spread-spectrum multichip signal. The multiple-chip or multichip signal is transmitted from the first ground station toward the transponder, so that the multiple chip signal passes through the transponder station over the same frequency channel or channels as the data. The multiple-chip signal is received at the first ground station, to form a received multiple-chip signal, and a replica of the pseudorandom code is phase-locked to the received multiple-chip signal, to within one chip interval, to thereby despread the spread-spectrum multiple-chip signal, and to reconstruct a data stream including a reconstructed identifiable digital word. A receive clock signal, having a receive clock interval equal to an integer multiple, including the integer one, of the duration of the pseudorandom code, is generated at the first ground station. An integer number of bits are counted at the first ground station between the time of transmission and the time of reception of the identifiable digital word, to thereby produce the coarse propagation (range-related) delay measurement. A high-speed counter is started at the first ground station concurrently with an identifiable portion of the transmit clock, and the counter is stopped on the next following corresponding identifiable portion of the receive clock, to thereby produce a fractional bit count which represents a fine propagation delay measurement. The coarse and fine propagation or range delays, together with an integer number of the bit intervals other than the coarse propagation delay, are summed together at the first ground station, to thereby define a calculated propagation delay. The data bursts are transmitted at the first ground station at times established in response to the calculated propagation delay. In a particular embodiment of the invention, a recurrent set of identifiable digital words is generated in conjunction with the step of generating an identifiable digital word at the first ground station, with at least one of the identifiable digital words in each set having the polarity of its bits inverted, as a result of which, in the step of receiving the multiple-chip signal to form a received multiple-chip signal, the received multiple-chip signal includes the set of identifiable digital words, and the step of phase locking results in a recurrent set of unique digital words, at least one of which has its bits inverted in each set. Also, a correlation is performed between (a) the data stream including a reconstructed identifiable digital word and (b) both positive and negative replicas of the identifiable digital word, in conjunction with the step of at the first ground station, counting an integer number of bits between the time of transmission and reception of the identifiable digital word, to coarsely measure the propagation delay. In the particular embodiment of the method, the recurrent set of identifiable digital words is generated with a predetermined pattern of inversion and noninversion of the identifiable digital words in each set. Also, in conjunction with the step of performing a correlation, a comparison is made between the sequential pattern of inverted and noninverted identifiable digital words and the predetermined pattern. The times of reception are deemed to be false if the sequential pattern does not match the predetermined pattern.

The one-way propagation delay between a ground station and the spacecraft is one-half of a difference, where the difference is that between the two-way or round-trip propagation delay and the inherent internal delay in the spacecraft loopback channel. The steps of transmitting a unique word, responding to the first one of the received unique words, and taking the difference between the transmission and reception times, are repeated a predetermined number of times, to form a group of measured delays. In one embodiment of the invention, the number of repetitions is three. Since there may be other ground stations transmitting the same unique word at different times, each ground station uses a different orthogonal or almost-orthogonal pseudorandom spreading sequence, making the ground station insensitive to the transmissions of the other ground stations. The propagation delay is transmitted to the other ground stations in one embodiment of the invention, and may be used to synchronize transmission of packets of information so that they arrive at the spacecraft at a particular time. In a preferred embodiment, the propagation delays determined by the various ranging stations are transmitted to a master ground station, which combines the propagation delays with the known locations of the ranging stations, to determine the location of the spacecraft. In addition, several sets of range measurements taken over time can be used to determine the spacecraft's ephemerides or orbital parameters. This location information is, in turn, transmitted from the master station to the other ground stations, which use it, together with knowledge of their own locations, to determine the appropriate packet transmission times. The ground stations which transmit data to other ground stations by way of the spacecraft need not be the same ones which transmitted the ranging signals to establish the propagation delay to the spacecraft, or which determined the location of the spacecraft. That portion of the ranging signals which does not include the unique word may be used, in one embodiment of the invention, for transmitting one or more of range information, spacecraft position, location information, or control data to other ground stations. The unique word or another sequence of symbols included in the master ground station's ranging signal may be used to mark a TDMA communication system frame epoch.

DESCRIPTION OF THE DRAWINGS

FIG. 4a illustrates the time relationship of the unique word interspersed with spacecraft coordinate information in the data stream of the ranging signal of the master ground station as it arrives at the spacecraft, FIGS. 4b and 4c illustrate the time relationships of the TDMA data signals (and their preambles) transmitted from two or more ground stations of the system as they arrive at the spacecraft, and FIG. 4d illustrates the frequency spectra of the ranging signal of FIG. 4a and the data signals of FIGS. 4b and 4c;

FIG. 7a is a replica of FIG. 4a, and represents a transmitted unique word and associated data, while

FIGS. 9a, 9b, and 9c illustrate time plots of data streams including unique words with both inverted and noninverted bits;

DESCRIPTION OF THE INVENTION

Figure 1:
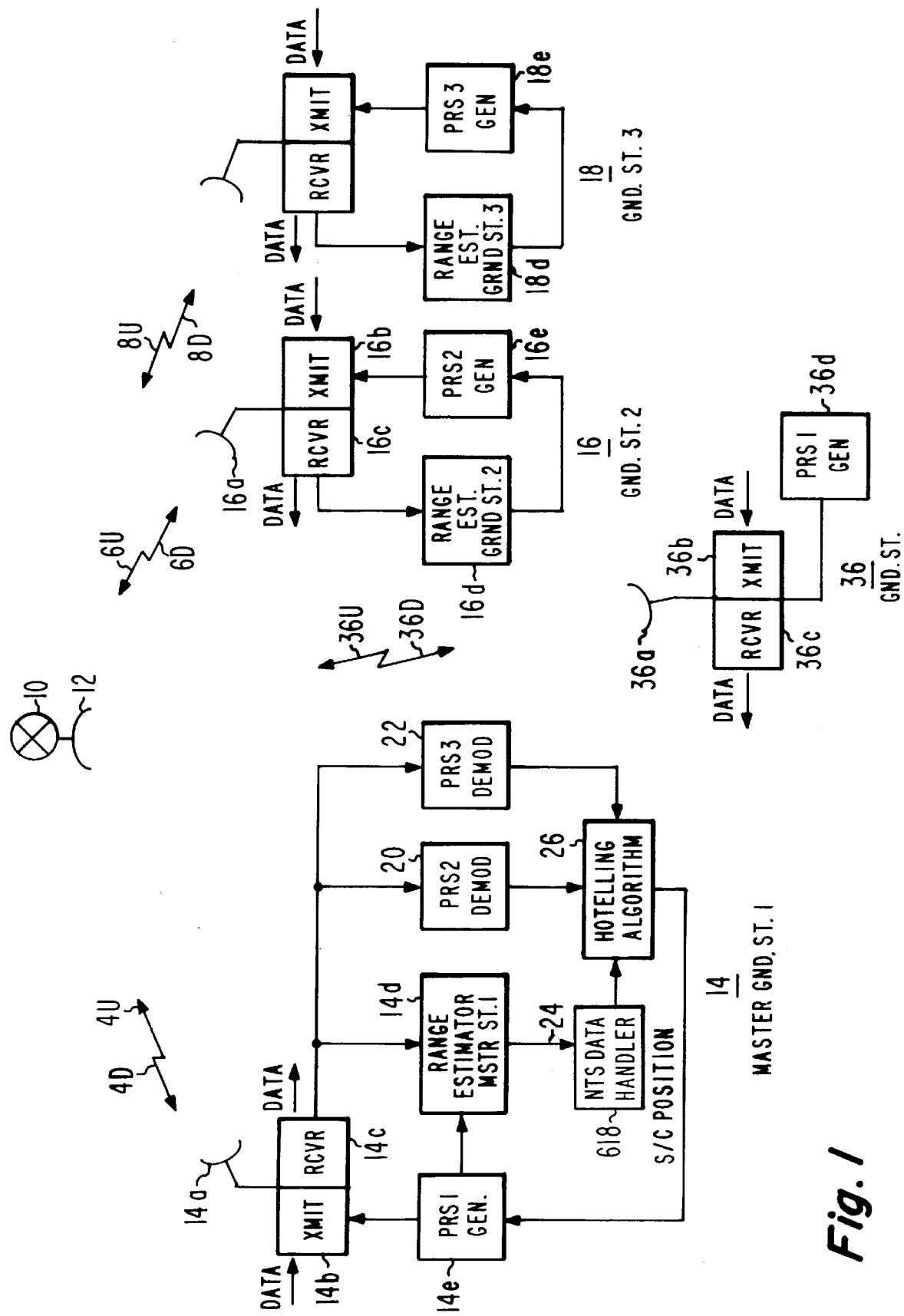
FIG. 1 is a simplified block diagram illustrating a plurality of ground stations communicating with each other by way of a spacecraft repeater.

In FIG. 1, a spacecraft 10 includes an antenna 12, and includes a known repeater or transponder channel for receiving uplink signals, and for repeating the signals in one or more downlinks. Those skilled in the art know that the downlink signals may be in a different frequency range, preferably a lower frequency range, than the uplink signals. First, second and third ground stations 14, 16, and 18, respectively, transmit signals to the spacecraft 10 by way of uplinks 4U, 6U, and 8U, respectively, and receive signals from the spacecraft by way of downlinks 4D, 6D, and 8D, respectively. Second ground station 16 includes an antenna 16a connected to a transmitter 16b and a receiver 16c. Transmitter 16b receives data to be transmitted from a local source, not illustrated, and modulates the data into packets, which may be of fixed duration, for transmission (over uplink 6U) using time-division multiple access of the satellite channel, and receiver 16c couples data packets received over downlink 6D to a local data sink, not illustrated. Receiver 16c is also connected to a range estimator block 16d. The estimated range is coupled to a pseudorandom ranging signal generator 16e, which modulates the range information by means of a pseudorandom sequence (PRS) 2 code which is unique to second ground station 16. Similarly, third ground station 18 includes an antenna 18a connected to a transmitter 18b and a receiver 18c. Transmitter 18b receives data to be transmitted from a local source, not illustrated, and modulates it into packets of fixed duration for transmission by way of uplink 8U to the spacecraft, and receiver 18c couples data packets received over downlink 8D to a local sink, not illustrated. Receiver 18c is also connected to a range estimator block 18d. The estimated range is coupled to a pseudorandom ranging signal generator 18e, which modulates the range information by means of a pseudorandom (PRS) 3 code which is unique to third ground station 18. The data applied to each transmitter 16b, 18b is transmitted within at least one channel to spacecraft 10. In a particular embodiment of the invention, the data transmitted by each of stations 16 and 18 is modulated onto one or more of a plurality of carrier frequencies within the bandwidth of the spacecraft data channel; this frequency division within the spacecraft channel allows plural data signals to pass through the same spacecraft transponder channel, and allows their separation after passing through the spacecraft repeater channel. A time division multiple access (TDMA) scheme is used within each frequency division of the spacecraft transponder channel. The multiple access technique is thus actually a FDMA/TDMA hybrid, in which each frequency band or "channel" of the repeater is shared by multiple ground stations. On the other hand, the ranging signals transmitted by each ground station 14, 16, and 18 are in code-division multiple access format, which means that they are spread-spectrum or wideband signals, which may take advantage of the entire spacecraft channel for best time resolution, but which do not significantly interfere with the relatively narrow-band data transmissions or with each other.

A first or master station 14 in FIG. 1 includes an antenna 14a which transmits signals produced by a transmitter 14b over uplink 4U toward spacecraft 10, and which receives signals retransmitted from spacecraft 10 by way of a downlink 4D, and couples the signals so received to a receiver 14c. Transmitter 14b receives data to be transmitted from a local source, not illustrated, and modulates the data into packets, which may be of fixed or of variable duration, for transmission to the spacecraft using time division multiple access, and receiver 14c couples data packets received from the spacecraft to a local sink, not illustrated. Receiver 14c is also connected to a range estimator block 14d.

Master ground station 14 of FIG. 1 also includes a PRS 2 demodulator 20 and a PRS 3 demodulator 22 coupled to receiver 14c, for receiving and demodulating the pseudorandom codes of the ranging signals originally transmitted by second ground station 16 and third ground station 18, respectively, to thereby enable the master ground station to retrieve the range information generated by ground stations 16 and 18. The range estimation or measurement produced by master station range estimator block 14d is coupled by a path 24 to a data handler 618 and then to a processor 26, and spacecraft range information relating to corresponding measurements performed at second ground station 16 and third ground station 18 is coupled to processor block 26. Processor 26 performs an averaging-type of operation on the various range estimates, as described in conjunction with FIG. 2 to reduce the plurality of measured ranges to a single set of most probable ranges. In a preferred embodiment of the invention, the processing in block 26 includes a Hotelling algorithm, such as that described in the publication "Global Positioning System", volume 1, ISBN 0-936406, 00-3, published in 1980 by The Institute of Navigation, 1800 Diagonal Road, Suite 480, Alexandria, Va., 22314, which iteratively produces an estimate of the actual spacecraft position. Such an estimate of the location may be derived from range measurements from as few as three separate locations; the first range estimate localizes the spacecraft to a sphere of known diameter, the second range measurement reduces the possible locations to an arc, and the third identifies a location on the arc. The estimate of the spacecraft position generated by the processing in block 26 is coupled to PRS1 generator 14e, and is encoded with, or modulated by, pseudorandom code PRS1 for transmission, by way of the spacecraft, to the other ground stations of the system, including ground stations 16 and 18.

Ground stations other than master ground station 14 of FIG. 1, such as second ground station 16 and third ground station 18, decode the information relating to spacecraft position by using a demodulator having stored therein a replica of the master station pseudorandom code PRS1. Each ground station thus has available a recent estimate of the spacecraft position, based upon a plurality of range measurements from three or more of the ground stations. This spacecraft position is also available to ground stations of the system which have no independent ranging equipment. The ground stations all know their own positions in absolute coordinates, either as a result of surveys, or, for a mobile ground station, by the use of a global positioning system (GPS) receiver. Since each ground station knows its own position and the position of the spacecraft, each ground station can determine, with great exactitude, the range between itself and the spacecraft. In turn, the range (together with the speed of the electromagnetic signal, which is the speed of light C) uniquely establishes the one-way electromagnetic signal propagation time between the ground station and the spacecraft. The calculations of range, given the locations of the spacecraft and of the ground station, are very conventional, and are not elaborated herein.

Each ground station must, however, still determine how much time to allow for propagation of each packet to the spacecraft so as to make it arrive at a particular time, namely at the beginning of the slot interval for which it is destined. In general, this is determined by each ground station from the known location of the ground station itself and the location of the spacecraft, together with synchronization symbols transmitted by the master ground station and received by each other ground station. More particularly, the time of arrival of the unique word from the master ground station establishes the beginning of a frame interval at the spacecraft, and may be considered to be a master timing signal. The same spread spectrum ranging signal from the master ground station is used to perform ranging, to carry the calculated spacecraft location, and to mark the system frame timing or time epoch. In particular, the ranging signal from the master ground station carries synchronization symbols which mark the frame time epoch. A frame begins concurrently with the arrival at the spacecraft of a specific portion, namely the synchronization symbol sequence, of the master ground station timing signal. The master ground station timing signal is manifested as an embedded unique word (UW) prefix 412 in the data stream of ranging signal 410, as described in conjunction with FIG. 4*a*. The master ground station ranging signals may occur more frequently than the master frame timing signal, or vice versa, and a ranging signal may coincide with each timing signal. In a preferred embodiment of the invention, the timing signals occur at the same rate as the unique words, so that each unique word corresponds to a timing signal, so that when stations come on-line their network time synchronization time is minimized. Each ground station other than the master ground station receives the master frame timing epoch or time signal in the form of a unique word, and decodes it (using the PRS1 which is known to each ground station), and, knowing it's own location, and the relevant propagation times, calculates when each recurrent frame interval begins at the spacecraft. Each ground station can then adjust its own data signal transmission times so that each slot of data arrives at the spacecraft at the beginning of the assigned time slot within the frame interval at the spacecraft. Thus, the ranging signals transmitted by ground stations 16 and 18 have the functions of identifying the range to the spacecraft, and they carry information relating to the current range estimate formed by the ground station to the master station, or to whatever location is performing the spacecraft location determination. The ranging signal of the master ground station performs the task of transmitting to the other ground stations the estimate of the location of the spacecraft, and the unique word portion functions as a master timing signal marking the beginning of each frame for the communication channels passing through the spacecraft wideband channel.

In order to make the context of the invention clear, FIG. 1 also includes a further ground station 36, which comprises an antenna 36*a*, a transmitter 36*b* which receives data from a local source (not illustrated), for modulation onto an uplink signal for transmission over an uplink 36U, and a receiver 36*c*. Receiver 36*c* receives signals from spacecraft 10 by way of downlink 36D, and extracts data for use by a local data sink. Ground station 36 also includes a PRS1 generator for generating a local replica of the pseudorandom spreading code PRS1 of master ground station 14. This signal is needed to despread the master station's ranging signal. Ground station 36 does not perform any ranging to determine the range from itself to the spacecraft. Instead, ground station 36, and all other like ground stations (not illustrated) derive their information about the spacecraft location by despreading the PRS1 ranging signal originating from master ground station 14, and recovering the spacecraft location which appears therein. The location of the spacecraft, together with knowledge of its own location, allows ground station 36 to determine the range to the spacecraft, and therefore the propagation delay.

Figure 2:
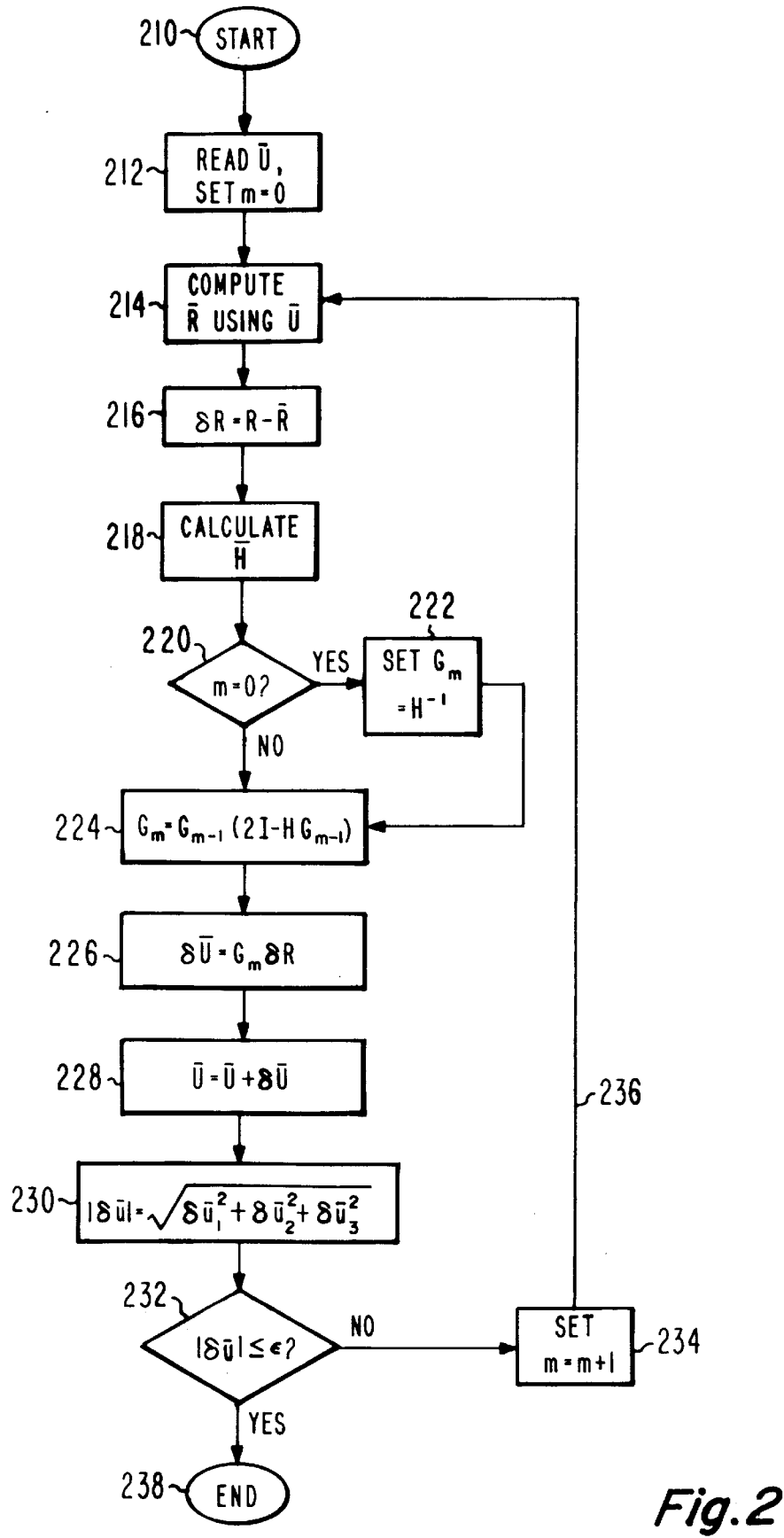
FIG. 2 is a simplified flow chart illustrating an algorithm which may be used at the master station to determine the position of the spacecraft from various known ground-station-to-spacecraft ranges.

FIG. 2 is a simplified representation of a flow chart which may be used at the master station 14 of FIG. 1 to generate an estimate of the spacecraft position from various range measurements. In FIG. 2, the logic begins at a START block 210, and proceeds to a block 212, which represents initialization, including the setting of a loop variable m to the value of zero, representing the first iteration, and the reading of the nominal spacecraft position $\overline{U}$, a column vector, available from a previous estimation. From block 212, the logic flows to a further block 214, which represents the computation of three-dimensional vector $\overline{R}$, $$\overline{R} = (\overline{r}_1, \overline{r}_2, \overline{r}_3)^T \tag{1}$$

calculated from the components of $\overline{U}$ and the locations of the three ground stations $$(x_{i1}, x_{i2}, x_{i3}) \tag{2}$$

for stations i, where i=1, 2, and 3. $\overline{U}$ represents the most recent estimate of the spacecraft position, and has components $(\overline{u}_1, \overline{u}_2, \overline{u}_3)$.

From block 214, the logic of FIG. 2 flows to a further block 216, which represents calculation a three-dimensional vector $\delta R$ $$\delta R = (\delta r_1, \delta r_2, \delta r_3)^T \tag{3}$$

where $\delta r_i = r_i - \overline{r}_i$ for i=1, 2, and 3; and $R = (r_1, r_2, r_3)^T$ is the vector of the distances from each of the ground stations to the spacecraft.

From block 216, the logic flows to a block 218, which represents calculation of a 3×3 matrix H formed by $$h_i = \left[ \frac{\overline{u}_1 - x_{i1}}{r_i}, \frac{\overline{u}_2 - x_{i2}}{r_i}, \frac{\overline{u}_3 - x_{i3}}{r_i} \right] \tag{4}$$

for i=1, 2, and 3. From block 218, the logic flows to a decision block 220, which examines the loop variable m, and routes the logic to its YES output if and only if the algorithm is in its first iteration. The YES output leads to a block 222, in which the value of $G_o$ is set equal to $H^{-1}$. Regardless of the iteration, the logic arrives at a block 224, which represents updating of the G matrix to its $m^{th}$ version.

$$G_m = G_{m-1}(2I - H\, G_{m-1}) \quad (5)$$

where

I is the identity matrix of conforming dimensions.

From logic block 224 of FIG. 2, the logic flows to a block 226, in which changes $\delta\overline{U} = (\delta_{\bar{u}}1, \delta_{\bar{u}}2, \delta_{\bar{u}}3)^T$ to the $\overline{U}$ column vector are computed as $$\delta U = G_m \delta R \quad (6)$$

following which the logic flows to a block 228. In block 228, the $\overline{U}$ vector is updated as follows $$U = U + \delta U \quad (7)$$

and, in block 230, the magnitude of the correction to the $\overline{U}$ vector is computed $$|\delta \overline{U}| = \sqrt{\delta \bar{u}_1{}^2 + \delta \bar{u}_2{}^2 + \delta \bar{u}_3{}^2} \quad (8)$$

Decision block 232 compares $|\delta \overline{U}|$ with a threshold $\epsilon$. Threshold $\epsilon$ is a number which is preestablished at the threshold between significance and insignificance. If the difference is larger than $\epsilon$, that is to say, if the difference is deemed significant, the logic leaves logic block 232 by the NO path, and arrives at a block 234. Loop variable m is incremented in block 234, and the logic returns by a path 236 to block 214 for another iteration. The iterations continue until, eventually, the difference is less than $\epsilon$. If the difference is no larger than $\epsilon$, the logic leaves decision block 232 by the YES output, and arrives at an END block 238. As mentioned above, the single estimate of the spacecraft position established by the logic of FIG. 2 is coupled to PRS1 generator 14e of master ground station 14 of FIG. 1, and is encoded for transmission, by way of the spacecraft, to the other ground stations.

The Hotelling algorithm depicted in FIG. 2 converges rapidly in this context. In a particular example, the initial guess of the spacecraft position is $\bar{u}_1 = 9484.8363$ km, $\bar{u}_2 = 41083.399$ km, and $\bar{u}_3 = 0.0$ km, where $\bar{u}_1$ is the Cartesian or orthogonal projection of the spacecraft position onto an axis passing from the center of the Earth through the equator at zero longitude, $\bar{u}_2$ is the projection of the spacecraft location onto an axis passing through the equator and 90° from the first axis, and $\bar{u}_3$ is an axis extending from the Earth's center through its North pole. The locations of the three ground stations are assumed to be

Figure 3:
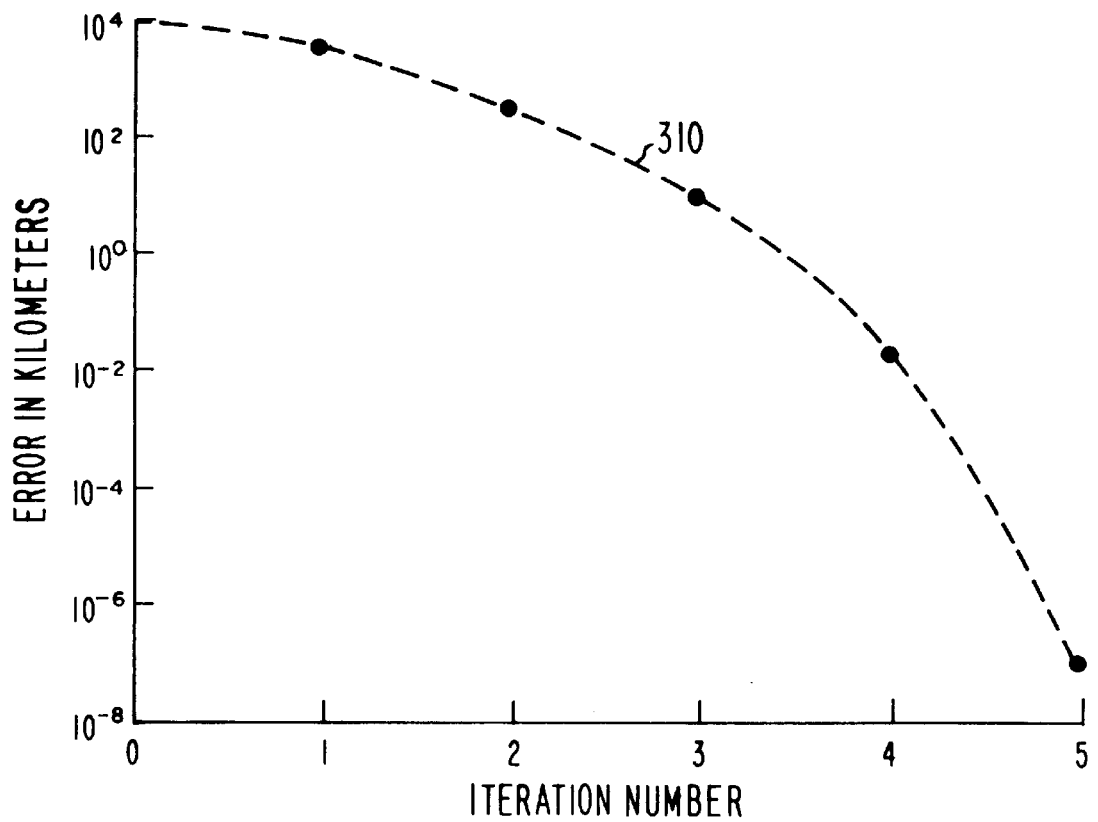
FIG. 3 is a log-scale plot of error in kilometers versus the number of iterations of the logic of FIG. 2 for a particular example.

| i | $x_{i1}$ | $x_{i2}$ | $x_{i3}$ |
|---|---|---|---|
| 1 | 2003.8039 | 1301.2855 | 5913.6315 |
| 2 | 3530.5185 | 2049.8928 | 4885.9342 |
| 3 | 1049.4402 | 4545.6248 | 4350.3632 | and the differences between the true position of the spacecraft and the initial position guess are (−202.958 km, −75.583 km, and −174.860 km). When the algorithm of FIG. 2 is run, convergence occurs after about five iterations, with errors after each iteration as illustrated by the values of plot 310 of FIG. 3.

Once the location of the spacecraft is established by the master ground station, the location is encoded using PRS1 at the master station, overlaid on data channels, and transmitted to the spacecraft. FIG. 4a illustrates an exemplary frame interval of the ranging signal 410 from among a plurality of contiguous frames in the ranging signal transmitted by the master ground station. As mentioned above, the master ground station ranging signal includes a unique word (UW) preamble 412 and network synchronization information in a body portion 414 (i.e. message-carrying portion) which may be encoded with, for example, spacecraft coordinate information. The stream of unique words and spacecraft coordinate data which together constitute the ranging signal are spread-spectrum encoded for code division multiple access. Recurrent times T1 represent the beginning of each frame interval at the spacecraft. A complete frame extends from the beginning of a unique word at time T1 until the beginning of the next following unique word at the next time T1. Thus, the illustrated condition of master ground station ranging signal 410 in FIG. 4a is that which occurs when it arrives at the spacecraft. In one embodiment of the invention, each frame interval in FIG. 4a, has a total duration of 40 milliseconds (msec), and contains an eleven-bit unique word, and body 414 contains 69 spacecraft position bits. All eighty bits in the signal from master station 14 are encoded using PRS1. FIG. 4b illustrates a representative composite data signal received on one spacecraft channel, comprising data signal bursts transmitted from any of the ground stations of the system, including, but not limited to, the master ground station and other ground stations which perform ranging. As illustrated in FIG. 4b, the data information is in the form of data bursts which arrive at the spacecraft in synchronism with the frame timing established by the master station's ranging signals. More particularly, FIG. 4b illustrates a data stream 430 including a plurality of bursts of data during each frame interval. As illustrated, there are three bursts within each frame interval, but more or fewer may be used as desired. Each data burst lies within a time slot, and thus, the first data burst, with its preamble, lies within time slot 1 of the illustrated frame of data stream 430. The second data burst and its accompanying preamble lie within slot 2, and the third burst lies within slot 3. Those skilled in the art know that each burst-and-preamble may come from a different one of the ground stations, or consecutive bursts of data may originate from a single ground station, depending upon the scheduling protocol in operation. The time of the beginning of a frame interval at the spacecraft can be determined at each ground station by simply subtracting that ground station's uplink propagation delay from the time of arrival at the ground station of the beginning of a unique word in the master timing signals. Since the slot durations are known a priori or broadcast dynamically on a control channel, the starting times of all future slot intervals at the spacecraft can be predicted at each ground station, and updated as each new network timing signal arrives. The time at which the beginning of a packet must be transmitted by a ground station in order to arrive at the spacecraft at the beginning of a slot interval is then determined at that ground station by selecting a slot interval during which the spacecraft is to process the packet, and subtracting one additional uplink propagation delay from the starting time of that particular slot interval at the spacecraft.

The bursts of data of FIG. 4b all lie within a relatively narrow-band channel within a wideband repeater channel of the spacecraft. FIG. 4c illustrates another stream of data 440 which may pass through the wideband repeater channel on another relatively narrowband channel within the wideband repeater channel of the spacecraft. The elements of the data stream 440 of FIG. 4c are similar to those described for data stream 430 of FIG. 4b, and the timing is established in the same fashion. FIG. 4d illustrates the frequency plan for the wideband repeater channel 450 bandwidth, and within the wideband repeater channel 450, the spectra of a plurality of narrower-band data channels, one of which is designated 430s to indicate that it represents the spectrum of the data stream 430 of FIG. 4b, another is marked 440s to indicate that it represents the spectrum of data stream 440, and yet others of which are designated 460a, 460b, . . . to indicate that other data channels may additionally be carried through the repeater. The spectrum of the wideband or spread-spectrum signal represented by data stream 410 of FIG. 4a is represented in FIG. 4d as a low-level noise-like signal 470, which is selected in known fashion so as not to interfere with the narrow-band signals 430s, 440s, etc.

A purpose of the invention is to avoid loss of usable communication spectrum and time, by allowing the packets of information to be transmitted to the spacecraft at times selected so that each packet arrives at the spacecraft in synchronism with a spacecraft time slot. In other words, the transmission of a packet must be timed so the beginning of a packet arrives at the spacecraft at the beginning of a slot interval, and so that its end is also within the slot interval. In this way, a transmitted packet cannot overlap onto another time slot, and thereby interfere with another packet occupying that time slot. Thus, the guard times may be reduced in proportion to the accuracy with which the propagation delay can be calculated. Therefore, it is desirable to measure the range between the ground station(s) and the spacecraft as exactly as possible.

Figure 5:
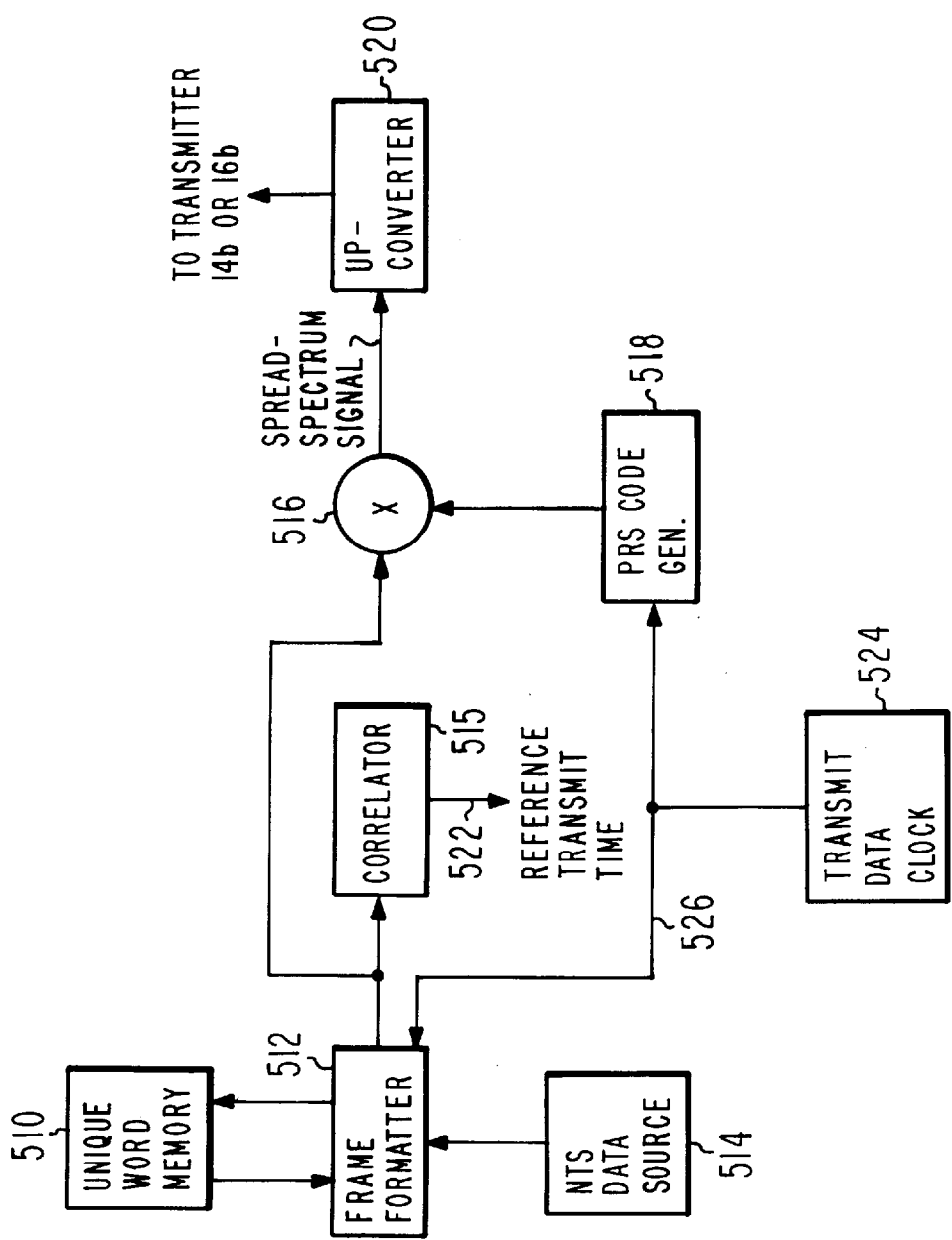
FIG. 5 is a simplified block diagram of the transmit side of the ranging portion of a ground station of FIG. 1, which generates the ranging signal.

FIG. 5 is a simplified block diagram of a portion of blocks 14e, 16e, or 18e of the ground stations of FIG. 1. In FIG. 5, a unique-word memory 510 is periodically addressed by a frame formatter 512, and provides a replica of the unique word (or its inverse, as described below) to the formatter. The frame formatter 512 combines the unique word with network timing signal (NTS) data from a source 514. In the case of the master ground station 14 of FIG. 1, the NTS data includes information relating to the calculated spacecraft position, and in the case of other ranging stations 16 or 18, NTS source 514 includes information relating to calculated or averaged range to the spacecraft. The time-sequence-combined signals produced by formatter 512 of FIG. 5 are applied to a correlator 515, which correlates the data passing therethrough with a replica of the identifiable digital word, to generate a reference transmit time on a data path 522, which starts certain counters associated with measurement of propagation delay, as described below. The time-sequence-combined signals produced by formatter 512 are also applied to a multiplier or mixer 516 together with a spreading code from a pseudorandom signal (PRS) generator 518, which is driven by a transmit clock signal generator 524. The spreading code modulates the signals produced by formatter 512, to produce rectangular chips of a spread-spectrum signal. These chips are the fundamental pulses or signalling elements of the spread-spectrum signal. The spread-spectrum signal is applied to an up-converter 520 for converting the spread-spectrum signal to the desired carrier frequency, which is in the band of the wideband repeater of the spacecraft.

As so far described, the system is similar to that described in copending patent application RDMM23783, "Spacecraft TDMA communications System with Synchronization by Spread Spectrum Overlay Channel", Ser. No. 08/655,112, filed may 29 1996 in the name of Hershey et al.

Figure 6:
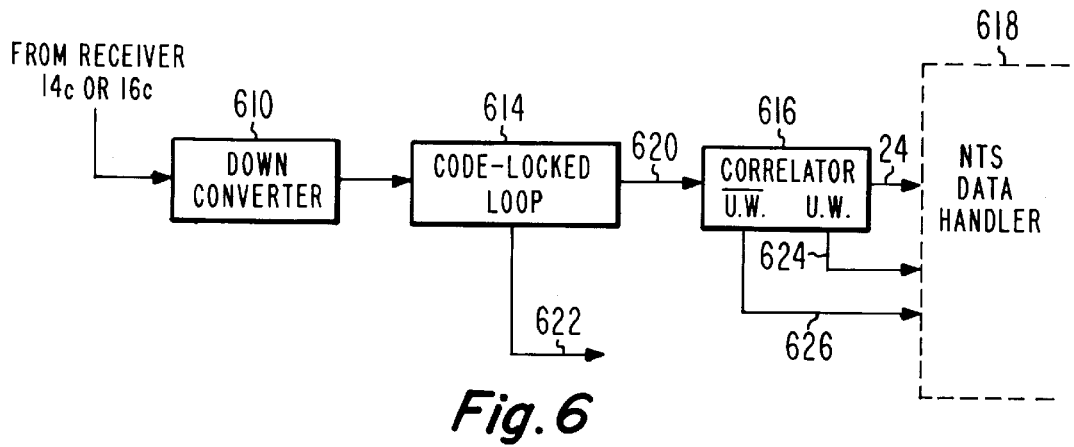
FIG. 6 is a simplified block diagram of the receive side of the ranging portion of a ground station of FIG. 1.

FIG. 6 is a simplified block diagram of the ranging portion of any of the ranging ground stations 14, 16, or 18 of FIG. 1. Ground station 14 is taken as an example. In FIG. 6, the signals from receiver 14c are applied to a downconverter 610, if not already downconverted by the receiver, and the downconverted signals are applied to a code-locked loop 614. As known to those skilled in the art, such a code-locked loop ordinarily includes a carrier-locked loop and also contains a multiplier, which mixes the downconverted signals with a PRS signal. The PRS signal used in block 614 should correspond to that of the signal that is to be received; in the case of ground station 14, block 614 produces PRS1 during its locking. Carrier tracking and code-locked loops are common in the art, and no additional description is necessary. The received data is generated on a signal path 620. Carrier tracking/code-locked loop 614 regenerates on signal path 622 a receive clock signal corresponding to the original transmit clock, but which is in-phase with the received signal. The recovered data is applied from loop 614 to a correlator 616, which produces a receive time signal on a path 624 at the moment that the unique word fills the correlator, in a manner similar to that described above for correlator 515 of FIG. 5. The recovered data at the output of correlator block 616 is applied to network synchronization data handler 618.

Figure 7A:
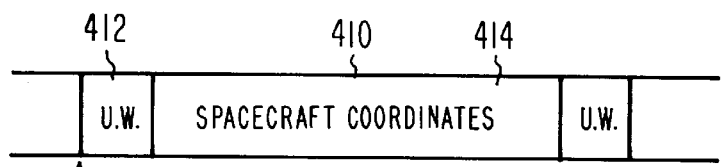
Figure 7B:
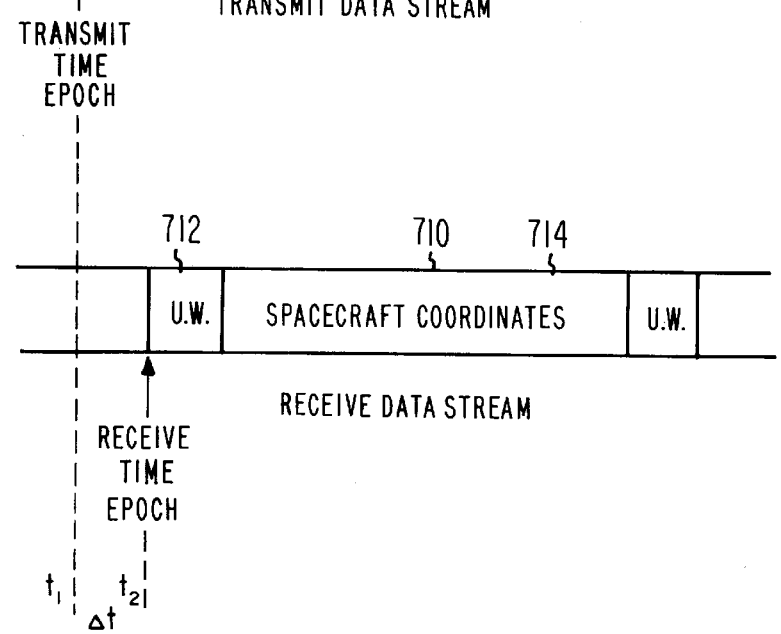
FIG. 7b represents a corresponding received data stream which is offset in time by a delay.
Figure 8:
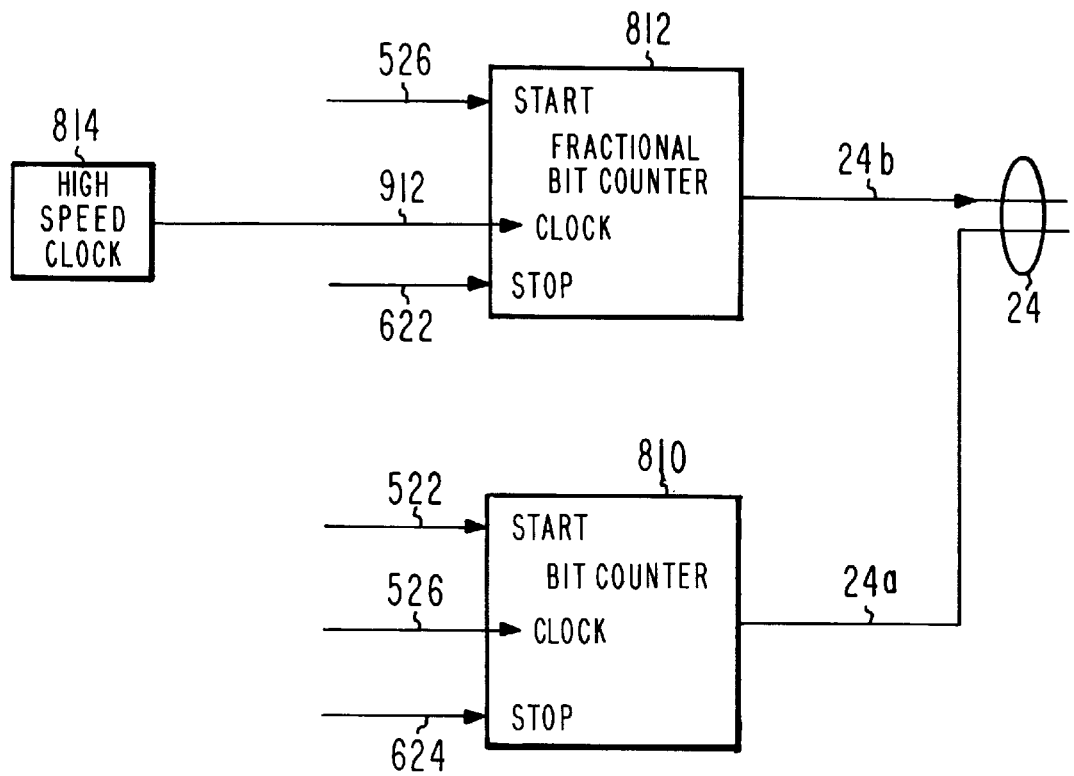
FIG. 8 is a simplified block diagram of one embodiment of a portion of the range estimator arrangement of FIG. 1.

FIG. 7a is a replica of FIG. 4a, and represents a transmitted unique word and associated data, while FIG. 7b represents a corresponding data stream which is offset in time by a delay. The data stream 710 of FIG. 7b represents the received version of the transmitted data stream 410 of FIG. 7a, but delayed in time by the difference $\Delta t$ between times $t_1$ and $t_2$. This time delay represents the combination of coarse and fine time delays. FIG. 8 represents as a block 810 an integer bit counter which is used to measure the coarse propagation time delay in units of bit duration of the transmit clock. Block 810 receives transmit clock cycles from path 526, and is enabled for counting by a START signal applied from transmit correlator 515 over signal path 522, and is disabled by a STOP signal from receive correlator 616 over a signal path 624. The count of bit counter 810 is generated on a signal path 24a, which is a part of signal path 24 of FIG. 1. Block 812 is a fractional bit counter, which counts high-speed clock cycles from a source 814. Fractional bit counter 812 is enabled by a START signal from transmit data clock 524 of FIG. 5, applied over a signal path 526, and is disabled by a STOP signal originating from the received data clock extracted by code locked loop 614 of FIG. 6, applied over path 622. The bit interval count begins at the inception of the transmitted unique word, and ends upon reception of the next unique word at the originating ground station. The time, measured in data bit intervals, is a fairly coarse measurement. In order to improve the measurement accuracy, a fractional bit counter is used. The fractional bit count begins at each transmitted bit and ends at the next received bit. Since this count recurs between each transmitted and received bit, the count will have the same value so long as the offset between the transmit and receive clocks remains the same. The offset will change with time, however, as the range to the spacecraft changes, and this change is tracked by the code locked loop.

The range measurement apparatus illustrated in FIG. 8 has capability for very fine resolution as determined by the frequency of the high-speed clock 622. A higher frequency high speed clock 814 provides capability for greater time resolution. Likewise, more stable transmit and receive clock signals applied over signal paths 526 and 622, respectively, also provide capability for finer resolution. Typically, the receive clock is derived from the received spread spectrum signal by a code-locked loop and is stable within approximately $\frac{1}{3}$ of a chip duration.

Further sub-chip resolution improvement may be achieved by averaging or curve-fitting several successive range measurements. In a preferred embodiment, illustrated in FIG. 8, a range measurement is recorded for each received bit.

The Hotelling algorithm used in block 26 must combine the coarse and fine propagation time delays transmitted on path portions 24a and 24b of path 24 of FIG. 1. There is a fixed time relationship between the coarse and fine delay measurements, and their combination is a simple matter. However, the total propagation delay between the ground station and the spacecraft may include one or more complete frame durations, where the frame is the duration illustrated in FIGS. 4a and 4b, which is the duration between unique words 412, or the sum of one unique word plus the information interval 414. When the duration of the frame is 40 msec, as described above, and the spacecraft is in geostationary orbit at about 23,000 miles, the number of complete frame durations in the round- trip propagation delay is about six. The number of frames may be measured if desired, or may be assumed to be known from the characteristics of the physical situation. In either case, the total propagation delay equals the sum of the above-described coarse and fine delays, plus the duration of some integer number of frame intervals.

The code-locked loops described for use in locking the receiver PRS code to the received signal are subject to phase ambiguity, in that they may lock in either an inverted or noninverted condition. When the code-locked loop locks in the inverted condition, all of the data carried on the signal, including the identifiable digital word, will be inverted. To effectively eliminate problems associated with the unknown state of the data, a "superframe" data structure is established in which, at the transmitter, every Nth unique word, where N>2, is inverted prior to transmission. At the receiver, correlations are performed for both the inverted and the noninverted unique word. From these correlation values, and from knowledge of the transmitted superframe structure, the receiver can identify whether or not the received data is inverted. More generally, this determination can also be made whenever the transmitted superframe contains R noninverted unique words and S inverted unique words, where R≠S.

An additional problem over and above the possible inversion of data is the possibility that the data portion 414 of each ranging signal 410 will inadvertently contain a bit pattern corresponding to the unique word, either in inverted or noninverted form. The existence of a unique word within the data could result in a tendency to lock to an incorrect portion of the data stream. This condition can be effectively eliminated in a number of ways. If the data 414 is purely random from frame to frame, the probability of the unique word accidentally appearing periodically with inversions fitting the expected superframe pattern is negligibly small. For some cases of interest, the data is not necessarily random from frame to frame. Additionally, the data 414 is typically encoded to provide error detection and correction (EDAC) capability. Several methods of encoding may be used. In a preferred embodiment, repetition coding is applied across all frames within a superframe. That is, the transmitted data 414 is identical in all frames within a superframe. This coding technique not only provides for robust error correction and detection, but further insures that, even if the data stream inadvertently contains the bit pattern of the unique word, or of its inverse, false locking cannot occur, because the false word will not invert periodically as will the true unique word.

Alternatively, encoding schemes other than repetition coding may be employed together with data scrambling and or bit stuffing to achieve a similar purpose.

FIG. 9a illustrates a portion of one superframe of ranging signals as transmitted, including a plurality of noninverted unique words 412 and associated data 414, with the bits of at least one unique word, illustrated as unique word 922, inverted by comparison with those of unique words 412. FIG. 9b represents the data resulting from noninverted locking to the received data stream of FIG. 9a, while FIG. 9c represents the data resulting from inverted locking, assuming that no channel errors exist. In FIG. 9b, the unique words 712 are noninverted, and the unique word 922 is inverted. In FIG. 9c, unique words 912 are inverted, while unique word 932 is not inverted.

Figure 10:
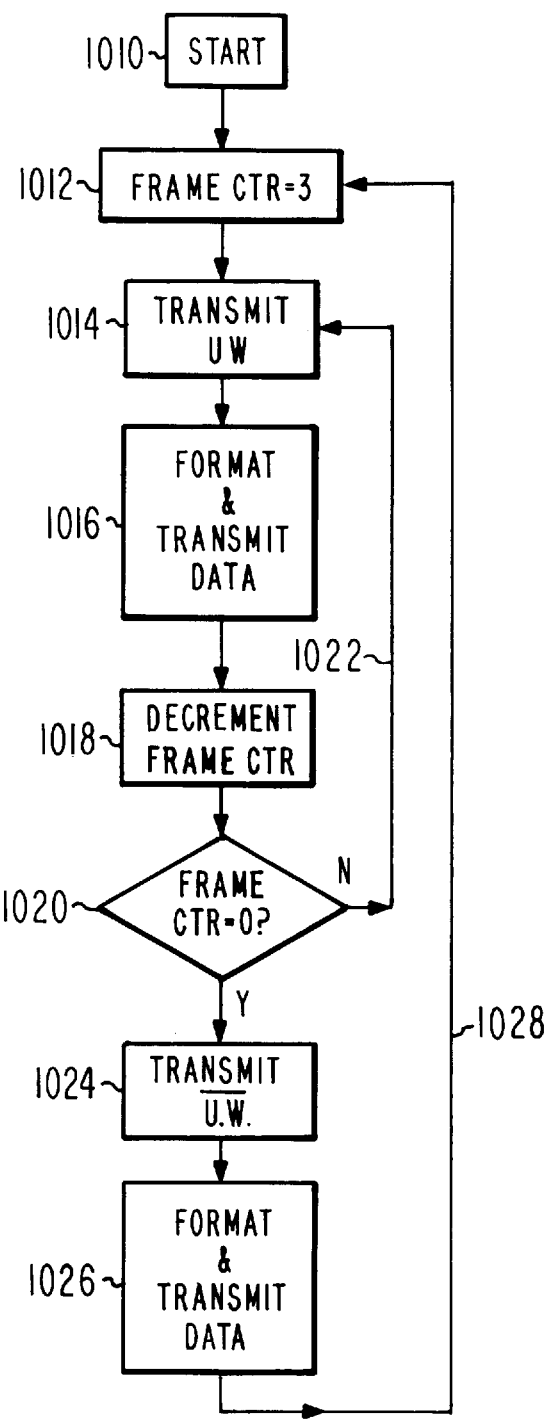
FIG. 10 is a simplified flow chart illustrating one possible mode of operation of the frame formatter of FIG. 5 when the data streams include unique words with both inverted and noninverted bits.

The explanation of the operation of formatter 512 of FIG. 5 is best made by assuming that memory 510 is loaded with both noninverted- and inverted-bit unique words, which are separately addressable, and that the operation of the formatter is controlled by the flow chart of FIG. 10. In FIG. 10, the logic begins at a START block 1010, and proceeds to a block 1012, which represents the initializing of a count-down frame counter to a value which represents the number of noninverted unique words in each superframe. In the illustrative example, the number is three. With the count-down counter initialized, the logic flows to a block 1014, which represents the addressing of the memory 510 to read the noninverted unique word, and transmitting the noninverted unique word. Block 1016 represents the formatting and transmitting of the data associated with the immediately preceding unique word. The logic then flows to block 1018, which decrements the frame counter. The logic then reaches a decision block 1020, in which the current count of the frame counter is compared with the value zero. So long as the count has not decremented to zero, the logic leaves decision block 1020 by the NO output, and returns to block 1014 by way of a path 1022. Eventually, the full number of noninverted unique words will have been transmitted for the current superframe, and the logic will leave decision block 1020 by the YES output, and flow to a block 1024, which represents reading from memory 510 the unique word with inverted bits ($\overline{UW}$), and transmitting the $\overline{UW}$ in the formatted information stream. From block 1024, the logic flows to a further block 1026, which represents the formatting and transmission of the data associated with the current unique word. The logic then returns to block 1012 by way of a logic path 1028. Recurrent flow of the logic around the loops of the flow chart of FIG. 10 within formatter 512 of FIG. 5 results in transmission, within each superframe of four data frames, including three unique words with noninverted bits and one unique word with inverted bits. Correlator 515 of FIG. 5 in this situation includes two parallel-connected correlators operating simultaneously, which consequently respond to unique words with bits of either polarity, to produce a transmit time pulse regardless of the bit polarity of the unique word.

Figure 11:
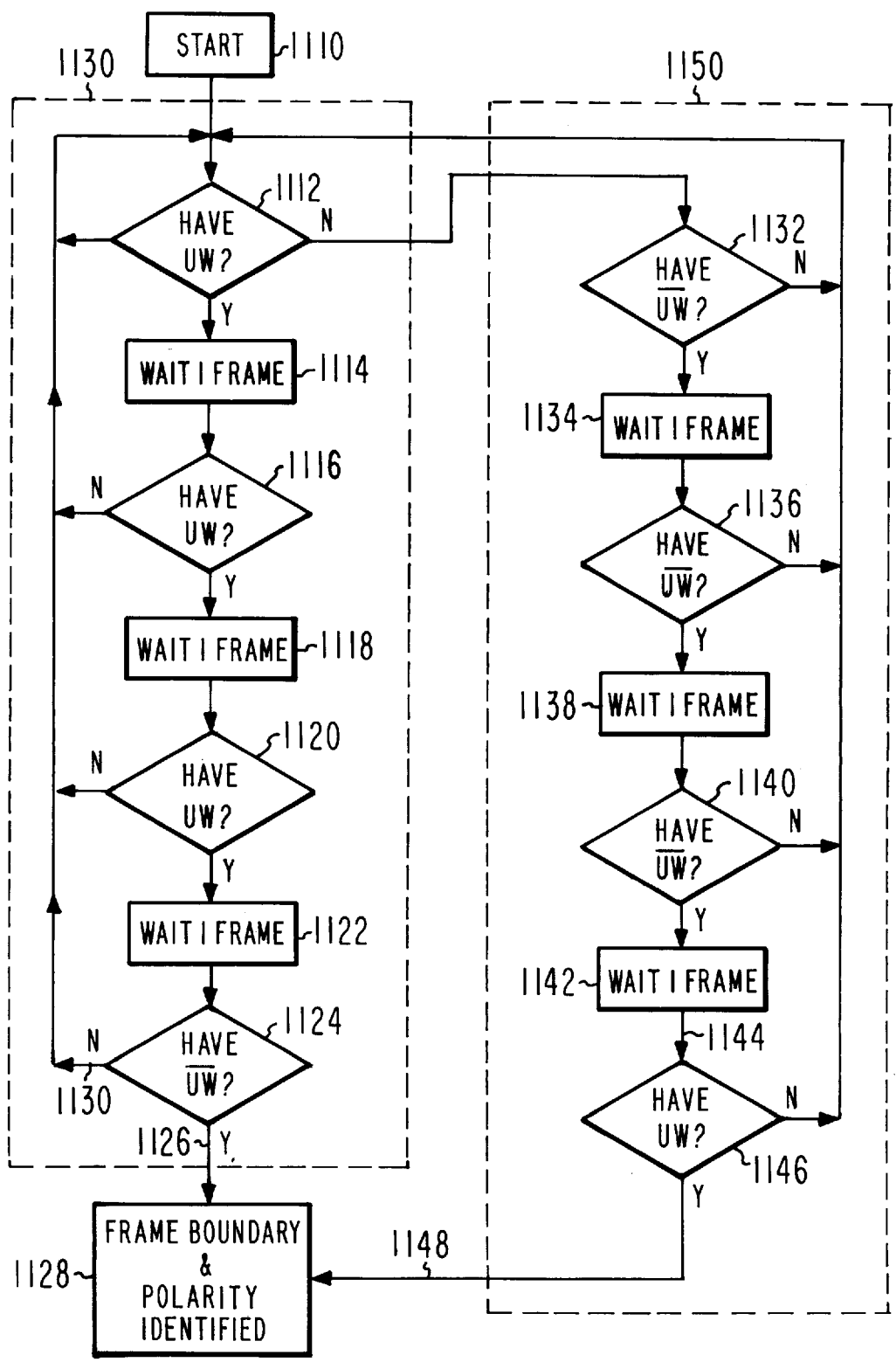
FIG. 11 is a simplified flow chart illustrating one possible embodiment of the NTS data handler 618 of FIG. 6.

In the flow chart of FIG. 11, the logic starts at a START block 1110, and flows to a decision block 1112. Decision block 1112 responds to the presence of a "noninverted" timing pulse from correlator 616 on path 624 or an "inverted" timing pulse on path 626, and generates a YES output when the unique word is noninverted, and a NO output when the unique word is inverted. In the absence of a unique word, decision block 1112 produces no output. When the unique word is noninverted, the logic flows to a delay block 1114, which represents a one-frame delay. From block 1114, the logic flows to a decision block 1116, which examines the timing signal lines from the noninverted portion of correlator 616, and identifies the presence of a noninverted unique word by producing a signal at its YES output. The combination of decision blocks 1112, 1116, 1120, and 1124, together with one-frame delays 1114, 1118, and 1122, may be viewed as a form of correlator, identified by dashed block 1130, which produces a YES output from decision block 1124 on path 1126 only upon the occurrence of a unique word with inverted bits preceded by three successive noninverted-bit unique words. The "correlator" 1130 of blocks 1112 through 1124 loops back to block 1112 by way of path 1130 if any part of the match fails. When the current unique word has inverted bits, the logic leaves decision block 1112 by the NO output path, and arrives at a further decision block 1132, which produces a YES output if the current unique word is inverted. From the YES output of decision block 1132, the logic flows to decision blocks 1136, 1140, and 1146 by way of one-frame delays 1134, 1138, and 1142, respectively. Blocks 1132 through 1146 together represent a correlator 1150, which responds with an output signal on signal path 1148 when a sequence of one noninverted-bit unique word preceded by three inverted-bit unique words is received, and otherwise defaulting back to decision block 1112. Thus, regardless of whether the code-locked loop 614 of FIG. 6 locks in its noninverted or inverted mode, the arrangement of FIG. 11 identifies the superframe sequence. Block 1128, then, receives a signal by either path 1126 or 1148 when a superframe has been identified. Block 1128 represents communication of this fact to the remainder of the system, so that it may respond properly, as by inhibiting the flow of timing signals from code-locked loop 614 of FIG. 6 until they are verified. While the correlation logic arrangement described in conjunction with FIG. 11 declares valid sync when four sequential unique words have been identified in the correct invert/noninverted sequence, other numbers of frames may be examined before correct synchronization is declared. In a preferred embodiment of the invention, six frames are examined during the period of initial lock-up or acquisition, and four during thereafter during tracking.

The logic illustrated in FIG. 11 may be extended to include searches beginning at arbitrary frames within the superframe structure to facilitate faster unique word acquisition, and such extensions are believed to be obvious to those skilled in the art.

Figure 12:
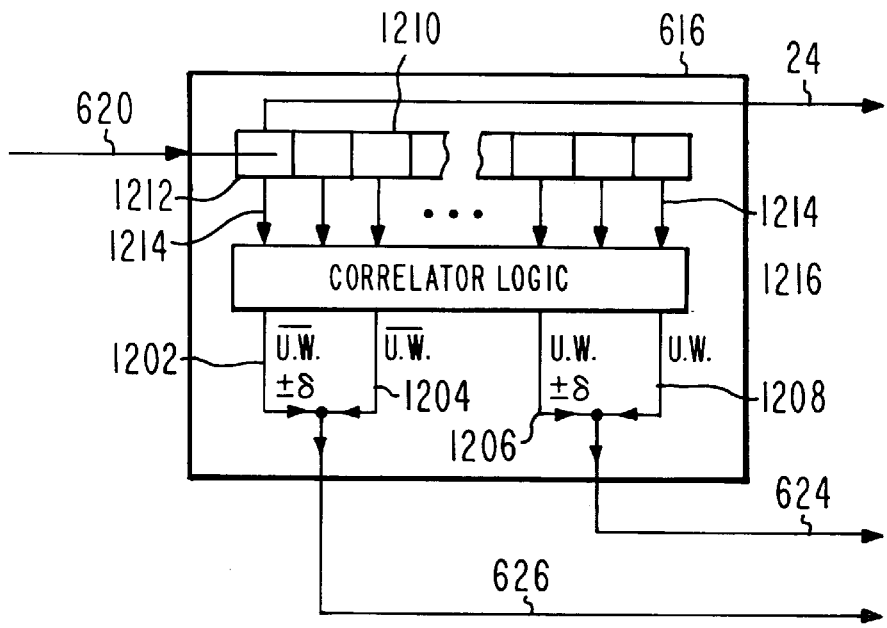
FIG. 12 is a simplified block diagram of a correlator which may be used in the operation of the arrangement of FIG. 6.

As so far described, the correlator 616 of FIG. 6 simply compares the data stream with a representation of the unique word, and produces a one-bit response indicating a match. Since the correlator operates on a received signal, the data stream may occasionally have a unique word in the correct timing location, but with one, or a few bad bits. It is undesirable to declare a lack of synchronization over a multiframe interval because of an occasional bad bit. In order to accommodate occasional bad bits, the correlator may include a threshold which is triggered at less than perfect correlation to produce the timing signal. In FIG. 12, correlator 616 includes a shift register array 1210 which receives the data stream from signal path 620. The data stream is applied to a first register 1212 of the array, and is clocked therefrom to output signal path 24, and to the remainder of the shift register array 1210. Shift register array 1210 has taps 1214, which couple the various delayed signals to a correlator logic circuit 1216, which in a preferred embodiment is a ROM addressed by the signals on taps 1214. The addressed memory locations of the ROM are preprogrammed with the an indication of the degree of correlation for every possible combination of address values. Thus, only a few addressed memory locations would typically have nonzero values. For example, if the input address (the values on the taps 1214) is very similar to the unique word, but differs by one bit, the addressed memory location would be preloaded with, for example, an eight-bit value indicating close, but nonperfect match of the data with the unique word. The nonperfect match value would be used after lock-up to accept the nonperfect data as a unique word. Ideally, each active one of the eight output bits of the addressed memory locations has a particular meaning; in a preferred embodiment of the invention, one bit represents perfect noninverted match, another represents perfect inverted match, a third represents a less-than-perfect noninverted match, and a fourth represents a less-than-perfect inverted match. The fifth is output 24. Other outputs might be inverted and noninverted yet-worse matches, if desired.

The invention, then, relates to timing the packet transmissions to arrive synchronous with the slot intervals at the spacecraft, regardless of the packet scheduling method. The invention can even be used with contention-type scheduling systems, in which different packets may occupy the same time slot at the spacecraft, with reallocation of the packets to other time slots being accomplished in some predetermined manner; i.e. slotted ALOHA. According to the invention, a single packet ideally never overlaps two different slot intervals, and even if contention allocation is used, the throughput of the communication system is improved by preventing a single packet from destroying or contending with information in either of the two adjacent time slots.

Other embodiments of the invention will be apparent to those skilled in the art. In particular, the invention is a complex system, susceptible of realization in many forms; the explanations necessarily simplify the operation to make the inventions themselves as clear as possible, but not every detail of an actual working embodiment has been included. In particular, many functions have been described as "blocks" which are actually implemented as software in a single processor. Those skilled in the art will know that software is often preferred to hardware, and that the various functions may be performed by either. While the arrangement of FIG. 1 processes the time delay to determine range at each of the ground stations, and transmits the range to the master station, the time difference itself, or the absolute times of transmission and reception, may instead be transmitted to the master station, which can perform the corresponding range determinations for each of the other ground stations. While a master station and three additional stations have been illustrated and described, the number of ground stations may be any number. While the invention is directed toward reducing the guard times required in each slot interval, it should be understood that the guard intervals may still be necessary. Note that, while it would require determination of the spacecraft location at each of the ground stations, it would be possible to transmit the three measured ranges to each of the ground stations, and perform the location calculation at each ground station. Those skilled in the art know that for purposes of data communication through a spacecraft transponder, "frequency reuse" of a portion of a channel's frequencies for an adjacent channel may be accomplished by polarization-selective transmission of the channels. Instead of modulating the body of the ranging signal of the master ground station with spacecraft location data, it may instead, or in addition, be desirable to modulate the body with the various ranges determined at the ranging ground stations, so that each station may perform its own spacecraft location calculations. As a further possibility, the body of the ranging signal might include network control information such as a second time marker for control of the ranging separately from synchronization of the network. As yet a further example of control information, the body of the ranging signal might include system loading information, which could be used to spread peaks of usage, and thereby assist in scheduling.

What is claimed is:

1. A method for operating a TDMA communication system, said method comprising the steps of:

at a first ground station, transmitting data bursts toward a transponder station within a frequency channel, which data is intended to be received at a second ground station;

at said transponder station, receiving said data transmitted by said first ground station, and any other signals arriving within said frequency channel, and retransmitting the same data, and any associated signals, toward said first and second ground stations;

at said second ground station, receiving said data retransmitted by said transponder station, and routing at least some of said data to a utilization means;

at said first ground station, generating an identifiable digital word, which digital word includes a plurality of bits synchronized with a transmit clock;

at said first ground station, modulating said identifiable digital word by a pseudorandom code including a plurality of chips, to thereby form a spread spectrum multichip signal;

at said first ground station, transmitting said multichip signal toward said transponder station, so that said multichip signal passes through said transponder station over the same frequency channel as said data;

at said first ground station, receiving said multichip signal to form a received multichip signal, and phase-locking a replica of said pseudorandom code to said received multichip signal, to within one chip interval, to thereby despread said spread-spectrum multichip signal, and reconstruct a data stream including a reconstructed identifiable digital word;

at said first ground station, generating a receive clock signal having a receive clock interval equal to the received bit duration;

at said first ground station, counting an integer number of bits between the time of transmission and reception of said identifiable digital word, to thereby produce a coarse range delay measurement;

at said first ground station, starting a high-speed counter concurrently with an identifiable portion of said transmit clock, and stopping said high-speed counter on the next following corresponding identifiable portion of the receive clock, to thereby produce a fractional bit count which represents a fine range delay measurement;

at said first ground station, summing together said coarse range delay, said fine range delay, and an integer number of said bit intervals other than said coarse range delay, to define a calculated range;

at said first ground station, transmitting said data bursts at times established in response to said calculated range.

2. A method according to claim 1, further comprising the steps of;

in conjunction with said step of generating an identifiable digital word at said first ground station, generating a recurrent set of said identifiable digital words, with at least one of said identifiable digital words in each set having the polarity of its bits inverted, whereby in said step of receiving said multichip signal to form a received multichip signal, said received multichip signal includes said set of identifiable digital words, and said step of phase locking results in a recurrent set of unique digital words, at least one of which has its bits inverted in each set;

in conjunction with said step of at said first ground station, counting an integer number of bits between the time of transmission and reception of said identifiable digital word to thereby produce a coarse range delay measurement, performing a correlation between (a) said data stream including a reconstructed identifiable digital word and (b) both positive and negative replicas of said identifiable digital word, to identify said times of transmission and reception of said identifiable digital word.

3. A method according to claim 2, further comprising the steps of:

in conjunction with said step of generating a recurrent set of said identifiable digital words, with at least one of said identifiable digital words in each set having the polarity of its bits inverted, generating said recurrent set with a predetermined pattern of inversion and noninversion of said identifiable digital words; and in conjunction with said step of performing a correlation between (a) said data stream including a reconstructed identifiable digital word and (b) both positive and negative replicas of said identifiable digital word, to identify said times of transmission and reception of said identifiable digital word, comparing the sequential pattern of inverted and noninverted identifiable digital words with said predetermined pattern, and deeming said times of transmission and reception to be false if said sequential pattern does not match said predetermined pattern.

4. A method according to claim 1, wherein said step of producing a fractional bit count representing fine range delay measurement comprises the step of generating a high-speed clock signal at a rate such that a plurality of cycles of said high-speed clock signal occur during a single chip duration of said multichip spread spectrum signal;

at said first ground station, counting said high-speed clock signals beginning at a time synchronous with transmission of said identifiable digital word;

at said first ground station, stopping said counting of said high-speed clock signals at a time synchronous with reception of said identifiable digital word to thereby establish a fine propagation delay measurement with accuracy better than one chip duration of said multichip spread spectrum signal;

at said first ground station, using said fine and coarse propagation delay measurements to calculate the range from said first ground station to said transponder station.

5. A method according to claim 3, wherein the received pattern of inverted and non-inverted identifiable digital words is used to resolve carrier phase ambiguity in said received multichip spread spectrum signal.

6. A method according to claim 3 wherein said predetermined pattern of inverted and noninverted identifiable digital words is used to establish a superframe structure for the purpose of formatting data transmitted between said identifiable digital words such that said data may be properly interpreted.

7. A method according to claim 6 wherein said data transmitted between said identifiable digital words is repetition coded for the purpose of increasing data reliability as well as for avoiding the accidental periodic occurrence of said pattern of identifiable digital words in said received data.

* * * * *